G. R. DAVENPORT.
VALVE ATTACHMENT.
APPLICATION FILED AUG. 8, 1919.
1,393,348.
Patented Oct. 11, 1921.
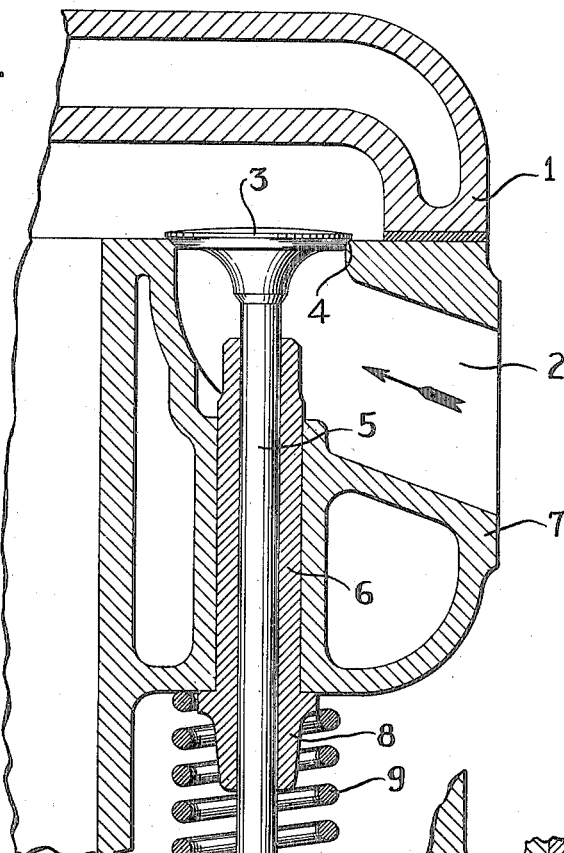
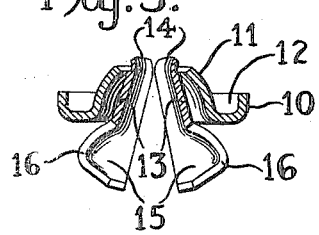
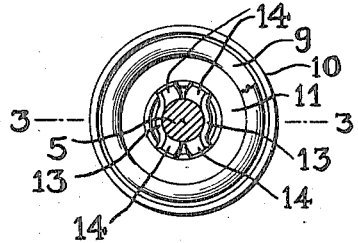
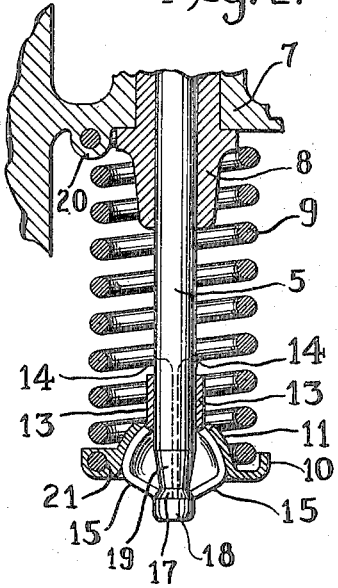
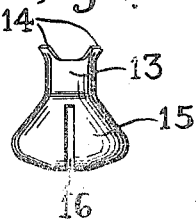
INVENTOR
George R. Davenport
BY
Stuart Perry
his ATTORNEYS

UNITED STATES PATENT OFFICE.

GEORGE R. DAVENPORT, OF DETROIT, MICHIGAN, ASSIGNOR TO THE STUDEBAKER CORPORATION, A CORPORATION OF NEW JERSEY.

VALVE ATTACHMENT.

1,393,348.  Specification of Letters Patent.  Patented Oct. 11, 1921.

Application filed August 8, 1919. Serial No. 316,016.

*To all whom it may concern:*

Be it known that I, GEORGE R. DAVENPORT, a citizen of the United States of America, and resident of Detroit, in the county of Wayne and State of Michigan, have invented certain new and useful Improvements in Valve Attachments, of which the following is a specification.

This invention has reference to means for holding valves firmly seated, and, particularly, has reference to valve-stem washers, so-called, through the medium of which the valve-stem is held properly with the valve firmly seated.

Among the objects of my invention may be noted the following: to provide a washer of novel form for valve-stems, together with coöperating means by which the valve-stem is held and properly maintained so that the valve may seat firmly; to provide means for maintaining the valve properly seated through the medium of removable and readily adjusted means for supporting the spring and holding the valve depressed; to provide a so-called valve-stem washer which may be removably held in place upon the end of the valve-stem, and which may be quickly applied and removed, so that the valve and its stem may be removed readily for any purpose desired; to provide a compact, simple, strong and durable means for holding a valve firmly seated, said means being removably secured to the end of the valve-stem without screws, pins or other media which are easily dropped or lost, when the parts are separated, broken or fractured, so as to render the device defective or inoperative; and to provide a valve-stem holding means which is compact, composite in form, and the parts of which are inseparable, but which may be readily manipulated for the removal of the valve-stem when it is desired to remove or replace the latter with its attached valve.

With the above objects in view and others which will be detailed during the course of this description, my invention consists in the parts, features, elements and combinations thereof hereinafter described and claimed.

In order that my invention may be clearly understood, I have provided drawings wherein:

Figure 1 is a sectional elevation of a portion of a valve-casing showing my invention;

Fig. 2 is a sectional elevation of a detail showing another form of my invention;

Fig. 3 is a section of the washer and holding means substantially on the line 3—3, Fig. 4, it being understood that the spring and stem of the valve are omitted;

Fig. 4 is a section substantially on the line 4—4 of Fig. 1; and

Fig. 5 is a detail of one of the resilient holding devices by which the washer and the valve-stem are separably connected.

It will be understood that my invention is applicable to the stems of valves, regardless of where the latter may be used. For purposes of illustration, and as an example of a mode of application of my invention, I have illustrated the latter in connection with the valve-stem of a valve for controlling the passage of gas, fuel or products of combustion in a gasolene engine. My invention, however, is not limited to this use or application, since it may be applied to valves for many commercial purposes.

Referring to the drawings, the numeral 1 indicates the combustion chamber, for example, of a hydrocarbon engine, the passage 2 into which is controlled by the valve 3, seated at 4. The stem 5 of the valve reciprocates in a bushing 6 mounted in usual manner in the valve-casing 7, and having its exposed end formed with an enlargement 8 for properly centering and maintaining the spring 9, and also forming an elongated bearing for the valve-stem. In the form of my invention shown in Fig. 1, the coiled spring 9 rests at one end against the valve-casing 7, and, at its other end, is supported in, and carried by, a washer. As shown in Figs. 1, 3 and 4, the washer is circular in form and has an upturned flange 10 and substantially conical and rounded body portion 11, forming between the two a gutter or groove 12, in which one end of the spring 9 is seated and held. The washer is held upon the stem of the valve, so as to properly sustain the spring 9, by means of a pair of resilient or spring clips. Each of the clips consists of a substantially semi-circular body 13, Fig. 5, terminating in a pair of divergent fingers 14, bent outwardly from the body portion 13. The body portion 13 is extended into a flared, bulbous skirt 15, which is longitudinally slotted at 16 to approximately the body portion 13, thus forming the skirt into a pair of resilient members adapted to yieldingly engage the inclined surface 17 of a head 18 at the free end of the valve-stem 5, said head and inclined surface being formed by reducing the valve-stem as at 19. The skirt portion of each of the clips is made to conform in part to the shape of the body portion 11 of the washer, so that, when the elements are grouped, as shown in Fig. 1, the clips and washer will snugly engage each other, and the washer will be sustained in proper position on the stem. The pair of resilient clips is inserted in the washer, as shown in Figs. 1 and 3, and then the fingers 14 are bent over so as to inseparably connect the clips and washer. By bending the fingers 14, as shown, the two clips may fulcrum one upon the other to the extent permitted by the surrounding body portion 11 of the washer, thus enabling the head of the valve-stem to be inserted between the clips, or the clips and washer to be slid upon the valve-stem. When the spring has been applied to the valve-stem, as shown in Fig. 1, and the attached clips and washer have been passed over the head of the valve-stem until the end of the spring is fully seated in the gutter 12, the spring clips will then be forced into the washer until the skirts of the clips snugly engage the body portion 11 of the washer, whereupon the resilient ends of the clips will snap over the head and engage the inclined surface 17 of the stem, as clearly shown in Fig. 1. Thus, the spring is securely held in place, as is also the washer, the latter being firmly held in position by the spring clips engaging the head 18 of the valve-stem. When the valve-stem is operated upon in the usual manner to unseat the valve 3, the spring will be compressed by the bodily movement of the clips and washer with the valve-stem. When it is desired to remove the valve from the casing 7, the spring 9 is compressed by pressure applied to the bottom of the washer, which releases the spring clips and enables their lower ends to be spread apart, as shown in Fig. 3, thus disengaging the clips from the head of the valve-stem, so that the clips, washer and spring may be removed from the stem, or the latter withdrawn from the clips, and washer through the bushing 6.

In the form of my invention shown in Fig. 2, the spring 9 has its inner end inserted in an aperture formed in a lug 20, provided on the casing 7. Thus the spring will not drop out of place. The opposite end of the spring is inserted in an aperture formed in a web or lug 21 in the gutter of the washer. Thus, the washer is held to the spring, and, since the clips are held to the washer, as above described, the spring, washer and clips constitute a composite assembly of elements which cannot be readily separated nor removed, when the valve-stem is withdrawn, as above described with reference to Fig. 1. This form of my invention is exceedingly useful, since frequently the parts will become separated when the valve is withdrawn, will drop down into the crank-casing, or, if laid aside, will frequently pick up dirt and grit, which, when the parts are reassembled, may be carried into the crank-casing and be liable to cause injury. When the valve-stem is withdrawn, the spring, washer and clips will simply hang substantially in the position shown in Fig. 2, with the clips hanging to the washer by the spread fingers 14, until the stem is slid into place, whereupon the washer will be lifted to compress the spring and the clips forced into the washer until the resilient skirt-ends snap over the head of the stem.

Having thus described my invention, what I claim and desire to secure by Letters Patent is:

1. In combination with a valve-stem, a washer surrounding the same, and a pair of relatively movable spring clips for securing the washer to the valve-stem.

2. A means for holding a valve seated, comprising a pair of spring clips engaging the stem of the valve, a washer engaging the clips, and a spring forcing the washer and clips together.

3. A means for holding a spring in functional relation to a valve-stem comprising a washer and a pair of spring clips, each of the latter consisting of a semi-circular body portion, a bulbous skirt slotted longitudinally, and a pair of divergent, bent fingers.

4. In combination with a valve stem, a washer having a central aperture and a pair of relatively movable spring clips, adapted to coöperate with the aperture in said washer, said valve stem adapted to coöperate with said clips, and means to cause a spring pressure to bear upon said washer.

5. Means for holding a valve seated, comprising a pair of clips adapted to engage retaining means on the valve stem, a washer having a central aperture, adapted to inclose said clips and stem, and a spring adapted to engage the washer, with means to retain the clips within the aperture of the washer.

6. Means for holding a valve seated, comprising a pair of spring clips adapted to engage the stem of the valve, a washer having a central aperture adapted to engage said clips and a spring adapted to force the washer and clips together to engage the stem, said spring being suitably secured at one end in a fixed position, and at the other end secured to the washer, the parts being so associated that when the valve stem is withdrawn said stem engaging means are held in their functional relation.

7. In combination with a valve casing, a valve stem, a washer surrounding the same and a pair of relatively movable spring clips for securing the washer to the stem, a spring interposed between the washer and a fixed part of the casing of the valve, and secured at one end to said casing and at the other end to said washer, so that when the stem is withdrawn said securing means will be held in functional relation to again receive and clamp the stem when again introduced between said clamping elements.

8. In combination with a valve casing, a valve having a stem suitably mounted to reciprocate, a washer having a central aperture and a trough adapted to receive and support a suitable spring, a spring interposed between the washer and the casing secured at one end to the casing and at the other end to the washer, a plurality of spring clips adapted to be received within the aperture of the washer, each of the clips consisting of semi-circular body portion and bulbous skirt slotted longitudinally and a pair of divergent bent fingers, said stem being provided at one end with an annular depression adapted to coöperate with one end of said clips, so that when said stem is introduced between said clips the mechanism described will function to secure the stem to the washer and bring the same under the power of said spring, but when the pressure of the spring is released the devices will function to release the stem substantially as described.

9. In combination with a valve casing, a valve stem provided with retaining means adapted to be engaged by clips hereinafter referred to, a washer with a spring interposed between the casing and the washer, said spring being secured both to the casing and the washer, a central aperture in the washer with a plurality of clips loosely mounted within said aperture with means to retain said clips within said aperture at all times, said clips being formed to be engaged by the washer when operated upon by the spring so that they will engage said retaining means on the stem, said clips being mounted to receive the valve stem and engage the retaining means thereon and the washer being adapted to engage the clips under the power of the spring pressure to cause the same to engage said retaining means on the stem so that when the washer is run onto the stem against the spring pressure and released, the clips will engage said retaining means on the stem, but when the spring pressure is released and the stem withdrawn said clips will be retained within the washer.

10. The combination, in a device of the class described, with a valve stem having an engaging element, of a pair of permanently connected supporting members for a valve spring, which members are capable automatically of interlocking with said engaging element when forced upwardly on said stem against the resiliency of said spring.

Signed by me at Detroit, Michigan, this 31st day of July 1919.

GEO. R. DAVENPORT.

Witnesses:
VINCENT LINK,
ALBERT B. WERDHOFF.